(12) United States Patent
Byun et al.

(10) Patent No.: US 7,248,400 B2
(45) Date of Patent: Jul. 24, 2007

(54) EMBODYING EQUIPMENT AND METHOD FOR AN ALL-OPTICAL OR LOGIC GATE BY USING SINGLE SOA

(75) Inventors: Young Tae Byun, Guri-Si (KR); Young Min Jhon, Seoul (KR); Seok Lee, Seoul (KR); Deok Ha Woo, Seoul (KR); Sun Ho Kim, Seoul (KR)

(73) Assignee: Korea Institute of Science and Technology, Daejon (KR)

( * ) Notice: Subject to any disclaimer, the term of this patent is extended or adjusted under 35 U.S.C. 154(b) by 97 days.

(21) Appl. No.: 11/170,178

(22) Filed: Jun. 29, 2005

(65) Prior Publication Data

US 2006/0092501 A1    May 4, 2006

(30) Foreign Application Priority Data

Oct. 29, 2004    (KR) ...................... 10-2004-0087027

(51) Int. Cl.
*G02F 3/00*    (2006.01)
(52) U.S. Cl. ........................ 359/344; 359/108
(58) Field of Classification Search ................ 359/107, 359/108, 344
See application file for complete search history.

(56) References Cited

U.S. PATENT DOCUMENTS

| | | | | |
|---|---|---|---|---|
| 6,424,438 | B1 * | 7/2002 | Byun et al. .................. | 359/108 |
| 6,462,865 | B1 * | 10/2002 | Chu et al. .................... | 359/344 |
| 6,624,929 | B2 * | 9/2003 | Kang et al. .................. | 359/344 |
| 6,778,303 | B2 * | 8/2004 | Song .......................... | 359/108 |
| 6,801,349 | B2 * | 10/2004 | Kim et al. ................... | 359/108 |
| 6,804,047 | B2 * | 10/2004 | Byun et al. .................. | 359/344 |
| 6,930,826 | B2 * | 8/2005 | Kim et al. ................... | 359/344 |

(Continued)

OTHER PUBLICATIONS

Jae Hun Kim, Young Min Jhon, Young Tae Byun, Seok Lee, Deok Ha Woo, Sun Ho Kim. All-optical XOR gate using semiconductor optical amplifiers without additional input beam. Photonics Technology Letters, IEEE. Publication Date: Oct. 2002. vol. 14, Issue: 10. On pp. 1436-1438.*

(Continued)

*Primary Examiner*—Jack Keith
(74) *Attorney, Agent, or Firm*—Harness, Dickey & Pierce, PLC

(57) ABSTRACT

Disclosed herein is an apparatus and method for implementing an all-optical OR logic gate. The apparatus includes an optical pulse generator, a Mode-Locked Fiber Laser (MLFL), a first optical splitter, a first optical delay line means, an optical control means, a first optical coupler, a second optical splitter, a second optical delay line means, a third optical splitter, an Erbium Doped Fiber Amplifier (EDFA), a Semiconductor Optical Amplifier (SOA), a second optical coupler, and an optical analyzer. The first optical splitter divides light output from the MLFL. The first and second optical delay line means acquire time delay. The optical control means controls intensity and polarization of the light. The first optical coupler generates the first input signal pattern as a probe signal. The second optical splitter divides light output from the first optical coupler. The third optical splitter divides the second input signal pattern. The EDFA amplifies the divided part of the second input signal pattern as a pump signal. The SOA couples the pump signal with the probe signal in opposite directions to perform the all-optical OR logic operation. The second optical coupler couples a signal output from the SOA with the second input signal pattern.

6 Claims, 6 Drawing Sheets

| A | B | OR |
|---|---|---|
| 0 | 0 | 0 |
| 0 | 1 | 1 |
| 1 | 0 | 1 |
| 1 | 1 | 1 |

U.S. PATENT DOCUMENTS

| | | | |
|---|---|---|---|
| 7,113,329 B2* | 9/2006 | DiJaili et al. | 359/344 |
| 7,123,407 B2* | 10/2006 | Byun et al. | 359/344 |
| 2002/0001112 A1* | 1/2002 | Song | 359/107 |
| 2002/0118441 A1* | 8/2002 | Kang et al. | 359/333 |
| 2003/0058527 A1* | 3/2003 | Kim et al. | 359/344 |
| 2003/0058528 A1* | 3/2003 | Byun et al. | 359/344 |
| 2003/0090784 A1* | 5/2003 | Kim et al. | 359/344 |
| 2004/0190101 A1* | 9/2004 | Hayashi et al. | 359/237 |
| 2006/0092501 A1* | 5/2006 | Byun et al. | 359/333 |
| 2006/0158716 A1* | 7/2006 | Byun et al. | 359/333 |

OTHER PUBLICATIONS

Young Tae Byun, Kyoung Sun Choi, Young Min Jhon, Deok Ha Woo, Seok Lee, Sun Ho Kim. Realization of high-speed all-optical OR gate using cross-gain modulation. Lasers and Electro-Optics Society, 2005. LEOS 2005. The 18th Annual Meeting of the IEEE. Publication Date: Oct. 22-28, 2005. On pp. 436-437.*

Ali Hamie, Ammar Sharaiha, Mikael Guegan. Demonstration of an all-optical logic OR gate using gain saturation in an SOA. Microwave and Optical Technology Letters. vol. 39, Issue 1 , pp. 39-42, Published Online: Aug. 5, 2003.*

Chang Wan Son, Sang Hun Kim, Young Min Jhon, Young Tae Byun, Seok Lee, Deok Ha Woo, Sun Ho Kim, Tae-Hoon Yoon. Simulation of All-Optical XOR, AND, OR gate in Single Format by Using Semiconductor Optical Amplifiers. Optoelectronic Materials and Devices. Proc. of SPIE vol. 6352, 63523R, (2006).*

Kim, Sang H.; Kim, J. H.; Lee, Jong S.; Son, C. W.; Byun, Y. T.; Jhon, Y. M.; Lee, S.; Woo, D. H.; Kim, S. H. Realization of all-optical basic logic gates using cross gain modulation in semiconductor optical amplifiers. Advanced Optical and Quantum Memories and Computing III. Proceedings of the SPIE, vol. 6130, pp. 111-118 (2006).*

Young Tae Byun, Kyoung Sun Choi, Young Min Jhon, Deok Ha Woo, Seok Lee, Sun Ho Kim, Jin Woo Park. All-optical OR gate using cross gain modulation in semiconductor optical amplifier. 2005 Conference on Lasers and Electro-Optics Europe. p. 493.*

* cited by examiner

| A | B | OR |
|---|---|----|
| 0 | 0 | 0 |
| 0 | 1 | 1 |
| 1 | 0 | 1 |
| 1 | 1 | 1 |

EMBODYING EQUIPMENT AND METHOD FOR AN ALL-OPTICAL OR LOGIC GATE BY USING SINGLE SOA

BACKGROUND OF THE INVENTION

1. Field of the Invention

The present invention relates generally to an apparatus and method for implementing an all-optical OR logic gate using the gain saturation characteristic of a single semiconductor optical amplifier and, more particularly, to technology for implementing a new all-optical OR logic gate that performs an all-optical logic operation using an optical signal, which is transferred from a certain point of an optical circuit, such as an optical computing circuit, as a pump signal and a probe signal.

2. Description of the Related Art

In accordance with a recent trend, the demand for a high-speed and large-capacity system is rapidly increasing. Meanwhile, the information processing capacity of a backbone network will increase from several hundreds of Gbit/s to several Tbit/s because the purpose of a future information/communication network is to provide multimedia services, including voice signals, still images and moving images. Accordingly, in order to transmit, process and exchange a large volume of data at high speed, all-optical signal processing technology is becoming core technology. In particular, all-optical logic operation that is capable of avoiding cumbersome electro-optic conversion is core technology for an all-optical signal processing system. Accordingly, the development of an all-optical logic gate that is important in next generation optical computing and all-optical signal processing fields is actively being carried out.

Up to now, an all-optical logic gate for ultrafast optical information processing has mainly used the nonlinear characteristic of a Semiconductor Optical Amplifier (SOA). In particular, all-optical logic gates were implemented through an Ultrafast Nonlinear Interferometer (UNI) [N. S. Patel, K. L. Hall and K. A. Rauschenbach, Opt. Lett., Vol. 21, 1466 (1996)] that uses the nonlinear characteristic and variation in refractive index of an SOA, a Michelson interferometer [T. Fjelde, D. Wolfson, A. Kloch, C. Janz, A. Coquelin, I. Guillemot, F. Gabortit, F. Poingt, B. Dagens, and M. Renauo, Electron. Lett., Vol. 36, 813 (2000)] in which SOAs are integrated, and through two SOAs with Cross Gain Modulation (XGM) [Korean Pat. No. 0452617 entitled "Apparatus for implementing all-optical OR logic gate using semiconductor optical amplifier," issued to Byun Young-Tea, Jun Young-Min, Kim Jae-Hun, Lee seok, Woo duck-Hwa, Kim Sun-Ho and Kang Kwang-Nam on Oct. 4, 2004] (hereinafter referred to as "Cited document 1") that uses the gain saturation and wavelength conversion characteristics of two SOAs.

In the above-described all-optical OR logic gate using SOAs with XGM, a probe signal and a pump signal pass through two SOAs. In this case, the width of a pulse signal increases because a gain recovery time is slower than a gain saturation time, so that operating speed is limited to below 2.5 Gbit/s. Furthermore, the logic gate uses two SOAs and, therefore, the structure of the logic gate is very complicated. Accordingly, to solve the two above-described disadvantages, the present invention implements an all-optical OR logic gate which has not only an operating speed above 2.5 Gbit/s but also a simplified structure using the gain saturation characteristic of a single SOA.

Furthermore, the present invention can operate at above 10 Gbit/s using SOAs with XGM, which has an operational principle identical to that of an all-optical AND logic gate [Korean Pat. Appl. No. 10-2003-64638 entitled "All-optical AND gate using gain saturation of SOA," filed by Kim Jae-Hun, Kim Byoung-Chae, Byun Young-Tea, Jun Young-Min, Lee seok, Woo duck-Hwa, Kim Sun-Ho and Lee Jong-Chang on Sep. 18, 2003], an all-optical NAND logic gate [Korean Pat. Appl. No. 10-2001-58131 entitled "Technology for implementing all-optical NAND logic gate using SOA," filed by Kim Jae-Hun, Byun Young-Tea, Jun Young-Min, Lee seok, Woo duck-Hwa, Kim Sun-Ho and Kang Kwang-Nam on Sep. 20, 2001], an all-optical NOR logic gate [Korean Pat. Appl. No. 10-2003-25361 entitled "Apparatus and method for implementing all-optical NOR logic gate using gain saturation of SOA," filed by Byun Young-Tea, Kim Jae-Hyun, Jun Young-Min, Lee seok, Woo duck-Hwa, Kim Sun-Ho and Lee Jong-Chang on Apr. 22, 2003] (hereinafter referred to as "Cited document 2"), and an all-optical XOR logic gate [Korean Pat. No. 0418654 entitled "Method of implementing all-optical XOR logic gate using semiconductor optical amplifier", issued to Kim Jae-Hun, Byun Young-Tea, Jun Young-Min, Lee seok, Woo duck-Hwa, Kim Sun-Ho and Kang Kwang-Nam on Feb. 2, 2004]. Accordingly, the present invention may be applicable to the implementation of complicated all-optical circuits for optical computing or all-optical signal processing systems.

SUMMARY OF THE INVENTION

Accordingly, the present invention has been made keeping in mind the above problems occurring in the prior art, and an object of the present invention is to provide a new all-optical OR logic gate which uses the gain saturation characteristic of a single SOA, and has not only an operating speed above 2.5 Gbit/s but also a simplified structure.

In order to accomplish the above object, the present invention provides a way in which both pump and probe signals are pulse patterns. The signals are clearly different from those of Cited document 1 in that pump and probe signals in Cited document 1 have pulse and Continuous Wave (CW) forms, respectively.

Particularly, in the prior art, the pulse width of a converted signal increases when the pump signal passes through an SOA. The pump signal successively passes through two SOAs to achieve all-optical OR logic operation, so that the pulse width of an output signal becomes considerably wider than that of the pump signal. Accordingly, in the prior art, the operating speed of an all-optical OR logic gate is limited to below 2.5 Gbit/s.

Such a problem can be overcome when both the pump and probe signals are pulse patterns and a single SOA is used. Furthermore, the present invention is advantageous in that the structure of an all-optical OR logic gate is simplified because a single SOA is used.

The present invention provides an apparatus for implementing an all-optical OR logic gate, including an optical pulse generator for generating an optical signal; a Mode-Locked Fiber Laser (MLFL) for generating first and second input signal patterns by operating the optical pulse generator; a first optical splitter for dividing light, which is output from the MLFL, at a ratio of 50 to 50; a first optical delay line means for acquiring the time delay of light output from the first optical splitter; an optical control means for controlling the intensity and polarization of the light output by the first optical splitter; a first optical coupler for coupling light output from the first delay means with light output from the optical control means, and generating the first input signal pattern as a probe signal; a second optical splitter for dividing light, which is output from the first optical coupler, at a ratio of 50 to 50; a second optical delay line means for delaying light output from the second optical splitter, and generating the second input signal pattern; a third optical splitter for dividing the second input signal pattern at a ratio of 50 to 50; an Erbium Doped Fiber Amplifier (EDFA) for amplifying the divided part of the second input signal pattern, which is obtained by the third optical splitter, as a pump signal; an SOA for coupling the pump signal with the probe signal in opposite directions to perform the all-optical OR logic operation; a second optical coupler for coupling a signal output from the SOA with the second input signal pattern; and an optical analyzer for detecting and analyzing light output from the second optical coupler.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The technical feature of the present invention resides in the implementation of an all-optical OR logic gate having not only an operating speed above 2.5 Gbit/s but also a simplified structure, which is one of the logic gates for performing an all-optical logic operation, using an optical signal transferred from a certain point of an optical circuit, such as an optical computing circuit, as a pump signal or a probe signal.

Particularly, in the existing all-optical OR logic gate (Cited document 1) implemented by the XGM method that uses both a gain saturation characteristic and a wavelength conversion characteristic of an SOA, a pulse pattern and a CW light are used for pump and probe signals, respectively. In this case, the operating speed of the all-optical OR logic gate is limited to below 2.5 Gbit/s because the pulse width of an output signal passing through two SOAs becomes wider than that of the pump signal. However, the present invention is advantageous in that the limitation of the operating speed is overcome and the structure of the all-optical OR logic gate is simplified because the pump and probe signals have a pulse form and the all-optical OR logic gate is implemented using a single SOA.

The construction and operation of an embodiment of the present invention is described in detail with reference to the accompanying drawings below.

Figure 1:
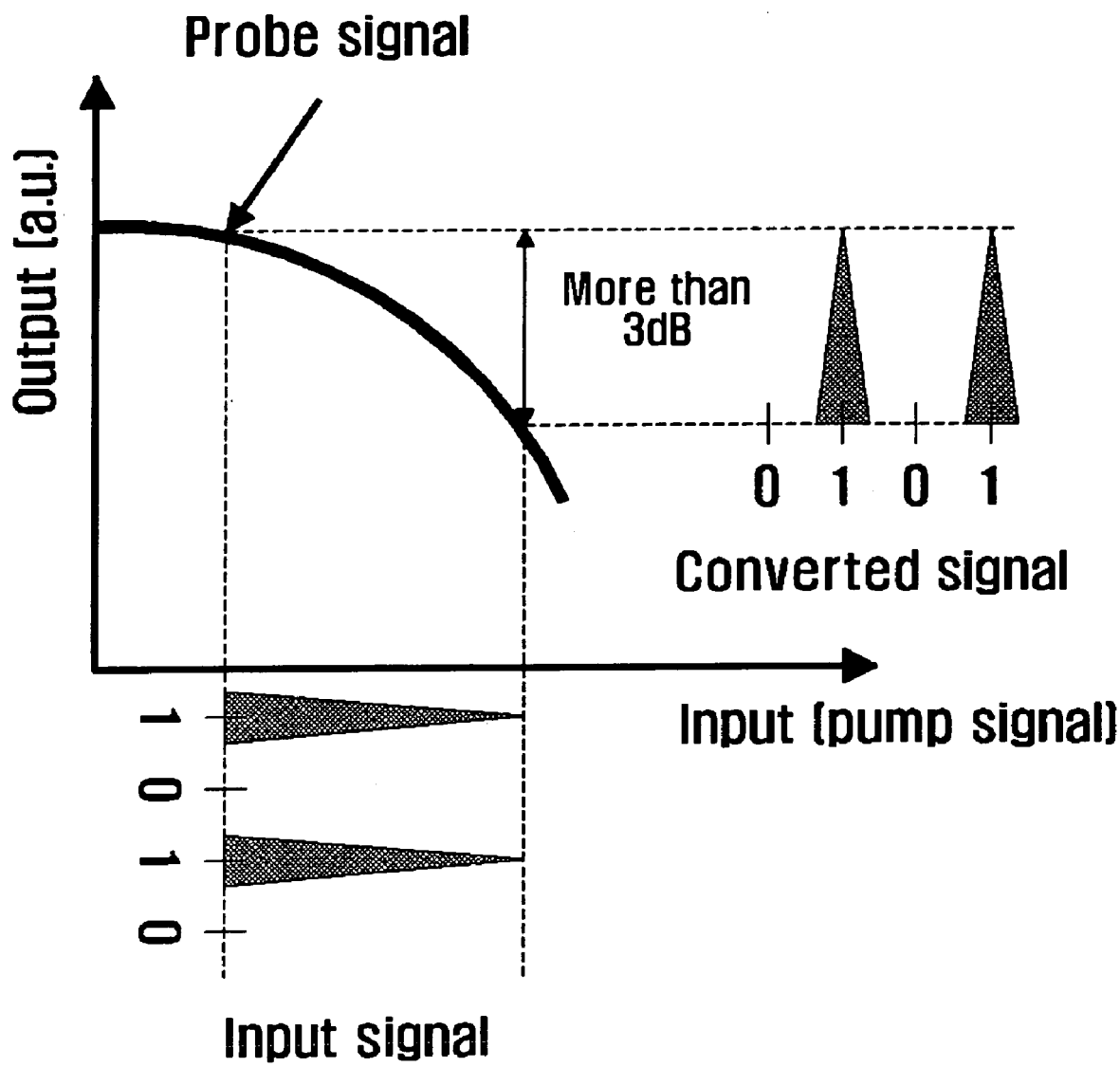
FIG. 1 is a view showing a gain saturation characteristic produced when a probe signal and a pump signal, both of which have a pulse form, enter an SOA according to the present invention.

FIG. 1 is a view showing a gain saturation characteristic produced when a probe signal and a pump signal, both of which have a pulse form, enter an SOA according to the present invention.

Referring to FIG. 1, both probe and pump signals are produced by using Return to Zero (RZ) pattern signals so as to increase the operation speed. When the pump signal having strong optical intensity enters an SOA, a carrier depletion phenomenon occurs inside the SOA. Accordingly, the probe signal that has a pulse form with a constant period is modulated in the same way as gain modulation resulting from carrier depletion in the SOA and is then output, so that an output signal has a logical state opposite to that of the pump signal.

Figure 2:
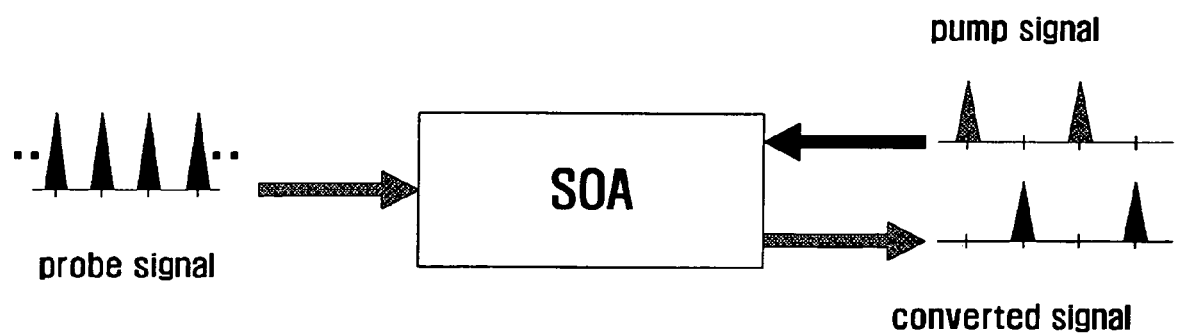
FIG. 2 is a diagram showing a converted signal produced by a gain saturation characteristic when the probe and pump signals having a pulse form enter the SOA according to the present invention.

Furthermore, in the case in which the probe and pump signals in a pulse form enter the SOA in opposite directions, a converted signal is output only when the pump signal does not exist. FIG. 2 is a diagram showing a converted signal produced by a gain saturation characteristic when the probe and pump signals in pulse forms enter the SOA of the present invention.

Figure 3:
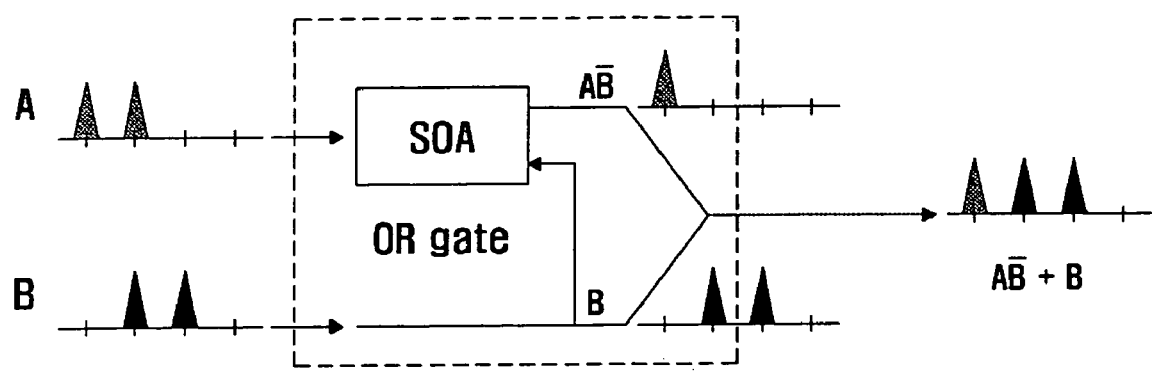
FIG. 3 is a view showing an OR gate and an OR truth table for conducting all-optical OR logic operation according to the present invention.

FIG. 3 is a view showing an OR gate and an OR truth table for conducting all-optical OR logic operation according to the present invention. In FIG. 3, it is assumed that the state in which a pulse exists is defined as an "ON" state and the sate in which a pulse does not exist is defined as an "OFF" state. In this case, when a pump signal B is in the "OFF" state, a probe signal A passes through the SOA, and the output signal is in the "ON" state. Accordingly, when the signals A and B, as shown in FIG. 3, enter the SOA, the Boolean $A\bar{B}$ of the signals A and B is obtained. Thereafter, the Boolean $A\bar{B}$ is combined to the B signal, so that Boolean $A\bar{B}+B$, that is, a logical value of the signals A and B, is obtained. The Boolean $A\bar{B}+B$ corresponds to the logical values in the truth table of the all-optical OR logic gate and, therefore, the all-optical OR logic gate is implemented by using a single SOA.

Figure 4:
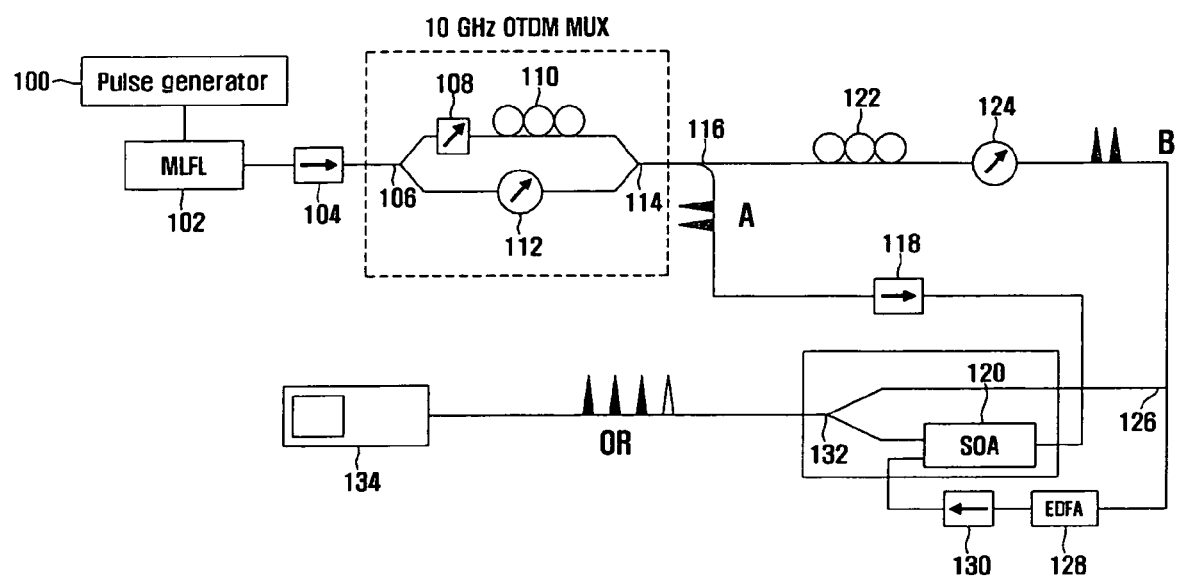
FIG. 4 is a diagram showing an apparatus for implementing an all-optical OR logic gate according to the present invention.

FIG. 4 is a diagram showing an apparatus for implementing an all-optical OR logic gate according to the present invention. Input signal patterns A and B are produced by an MLFL having a wavelength of 1550 nm so as to verify all-optical OR logic operation. The MLFL 102 operates at a frequency of 2.5 GHz with a pulse period of 400 ps.

The light output from the MLFL 102 passes a first isolator 104, and is divided at a ratio of 50 to 50. The divided light passes through a delay means, that is, a first optical delay line 112, and a control means, that is, an attenuator 108 and a polarization controller 110, respectively, and are then recombined by the first 50:50 fiber coupler 114, so that an input signal pattern A of 1100 is produced. Thereafter, the signal pattern A of 1100 is divided at a ratio of 50 to 50 by a second optical splitter 116, and light having the signal pattern A of 1100, entering an upper optical fiber, passes through a second polarization controller 122, and then passes through a delay means for acquiring a time delay of 100 ps, that is, a second delay 124, so that an input signal pattern B of 0110 is produced. The signal pattern B of 0110 is divided at a ratio of 50 to 50 by a third optical splitter 126. A signal B having a divided pattern is amplified by an EDFA 128, passes through a third optical isolator 130 and then enters the left side of an SOA 120. This signal pattern B is used as a pump signal.

Meanwhile, the signal pattern A of 1100 entering a lower optical fiber passes through a second isolator 118 and then enters the right side of the SOA 120. This signal pattern A is used as a probe signal. An output signal converted by the SOA 120 due to gain saturation results to Boolean $A\bar{B}$ of the signal patterns A and B. Thereafter, the Boolean $A\bar{B}$ is combined to the B signal and, therefore, Boolean $A\bar{B}+B$ is obtained. The resulting signal pattern is measured by an optical signal analyzer 134 that detects and analyzes output light. As a result, the pulse pattern of the output signal $A\bar{B}+B$ becomes 1110 and corresponds to the logical values in the truth table of the all-optical OR logic gate, so that the all-optical OR logic gate is implemented using a single SOA.

Although, in the present invention, the wavelengths of the probe and pump signals are the same, the operation of the all-optical OR logic gate can be achieved through the above-described method even when the wavelengths are different from each other. In this case, another light source having a different wavelength is required.

Figure 5:
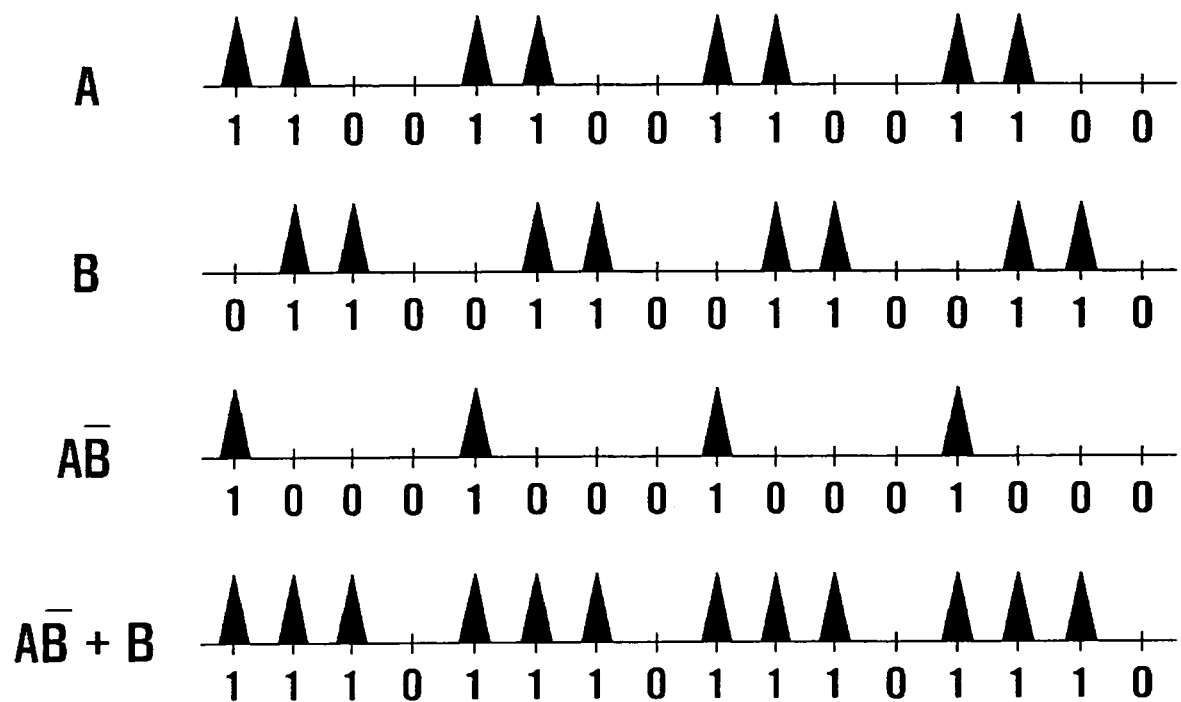
FIG. 5 is a waveform diagram showing a probe signal pattern A of 1100 and a pump signal pattern B of 0110, the logic signal pattern $A\bar{B}$ of the SOA and an all-optical OR logic signal pattern $A\bar{B}+B$ that are required for the all-optical OR logic gate according to the present invention.

FIG. 5 is a waveform diagram showing the operation characteristic of the all-optical OR logic gate, which shows the probe signal pattern A of 1100 and the pump signal pattern B of 0110. Furthermore, FIG. 5 shows the output signal pattern $A\bar{B}$ of the SOA 120 and an output OR signal pattern $A\bar{B}+B$ in which the output signal pattern $A\bar{B}$ of the SOA 120 is combined to the pump signal pattern B of 0110. The output light exists when the output OR signal pattern $A\bar{B}+B$ is (1,0), (1,1) or (0,1), but the output light does not exist only when the output OR signal pattern $A\bar{B}+B$ is (0,0). Accordingly, these logic signals correspond to logical values in the truth table of the all-optical OR logic gate, so that it can be confirmed that the operation characteristic of the all-optical OR logic gate has been implemented.

Figure 6:
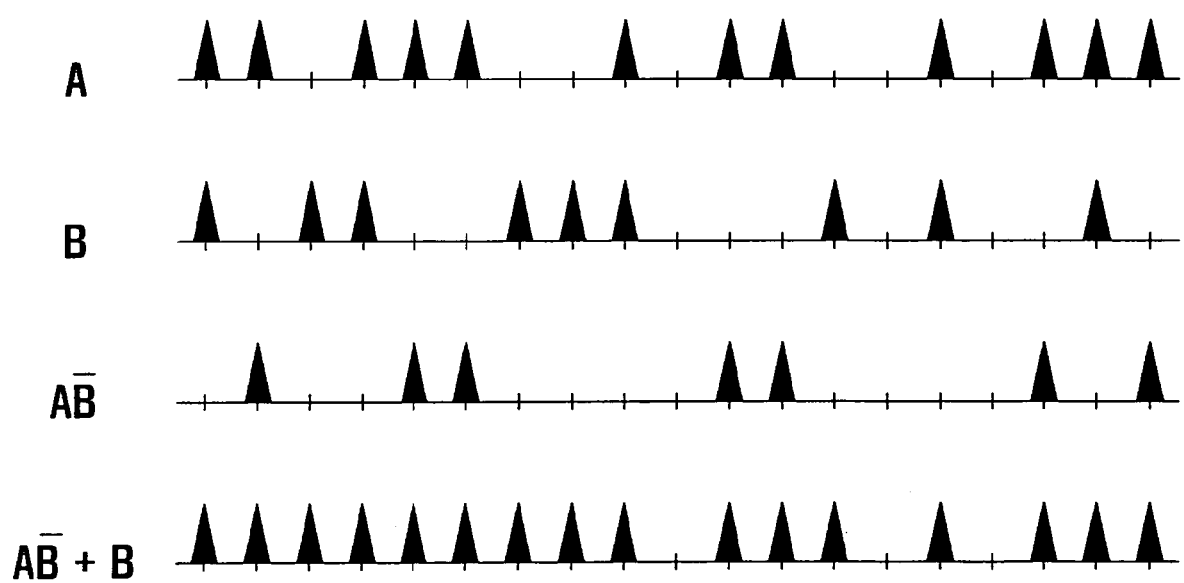
FIG. 6 is a diagram illustrating the characteristic of the all-optical OR logic gate operated by a probe signal pattern A and a pump signal pattern B that are produced in the form of an arbitrary pulse pattern.

In the case of FIG. 5, the signal patterns A and B are produced in the form of specific patterns, respectively, such as 11001100 . . . and 01100110 . . . . Accordingly, the all-optical OR logic gate must be operated in conjunction with the pulse signal of an arbitrary pattern. FIG. 6 illustrates an example of the operation of the all-optical OR logic gate in conjunction with two signal patterns A and B that are produced to have arbitrary pulse patterns. The output signal $A\bar{B}+B$ is 0 only when both signal patterns A and B are 0, so that all-optical OR logic operation is achieved.

Meanwhile, the present invention greatly differs from Cited document 1 in that both the pump and probe signals are a pulse pattern and in that a single SOA is used. In the case of the cited document 1, the pulse width of a signal converted by an SOA becomes wider than that of a pump signal entering the SOA because the pump signal has a pulse form and the probe signal is a continuous wave (CW) signal. Furthermore, two SOAs are used to achieve an all-optical OR logic operation, so that the pulse width is doubled compared to the case of a single SOA. As a result, operating speed is limited to below 2.5 Gbit/s because all-optical OR logic signal pulses overlap each other in the case in which the operating speed is higher than 2.5 Gbit/s.

However, in accordance with FIG. 4 showing the prior art, that is, Cited document 2, when both probe and pump signals entering a single SOA have a pulse form, the width of a pulse signal output from the SOA is almost the same as the width of a pulse signal entering thereon and, therefore, pulse width does not increase. Accordingly, in the case of Cited document 2, the operating speed of an all-optical NOR logic gate is 10 Gbps. Likewise, in the present invention, both the probe and pump signals have a pulse form and only a single SOA is used, so that the limitation of operating speed of the existing all-optical OR logic gate can be overcome.

As described above, the present invention can implement an all-optical OR logic gate having not only an operating speed above 2.5 Gbit/s but also a simplified structure by using an optical signal transferred from a certain point of an optical circuit, such as an optical computing circuit, as a pump signal or a probe signal. This is a core technique that is essentially required when optical computing or all-optical signal processing systems are implemented along with some logic gates (AND, OR, XOR, NOR and NAND) operated according to the same operational principle as in the existing all-optical OR logic gate using SOAs with XGM. Accordingly, the development of integrated technology for effective all-optical logic gates enables the control of all-optical circuits and systems using only optical signals without depending on electrical signals.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An apparatus for implementing an all-optical OR logic gate comprising:
    an optical pulse generator configured to generate an optical pulse signal;
    a Mode-Locked Fiber Laser (MLFL) configured to generate first and second input signal patterns by operating the optical pulse generator;
    a first optical splitter configured to divide light, which is output from the MLFL, at a ratio of 50 to 50;
    first optical delay line means for acquiring time delay of light output from the first optical splitter;
    optical control means for controlling intensity and polarization of the light output by the first optical splitter;
    a first optical coupler configured to couple light output from the first delay means with light output from the optical control means, and generating the first input signal pattern as a probe signal;
    a second optical splitter configured to divide light, which is output from the first optical coupler, at a ratio of 50 to 50;
    second optical delay line means for delaying light output from the second optical splitter, and generating the second input signal pattern;
    a third optical splitter configured to divide the second input signal pattern at a ratio of 50 to 50;
    an Erbium Doped Fiber Amplifier (EDFA) configured to amplify divided part of the second input signal pattern, which is obtained by the third optical splitter, as a pump signal;
    a Semiconductor Optical Amplifier (SOA) configured to couple pump signal with the probe signal in opposite directions to perform the all-optical OR logic operation;
    a second optical coupler configured to couple a signal output from the SOA with the second input signal pattern; and an optical analyzer configured to divide and analyzing light output from the second optical coupler.

2. The apparatus as set forth in claim 1, wherein the all-optical OR logic gate operates regardless of whether wavelengths of the probe and pump signals are identical to or different from each other.

3. The apparatus as set forth in claim 1, wherein the SOA receives the pump and probe signals entered in opposite directions, so that Boolean $A\overline{B}$ is obtained.

4. The apparatus as set forth in claim 3, wherein both the probe and pump signals enter the SOA in pulse forms having arbitrary patterns.

5. The apparatus as set forth in claim 4, wherein the probe and pump signals operate at a speed above at least 2.5 Gbit/sec when both the probe and pump signals enter the SOA in pulse forms.

6. The apparatus as set forth in claim 1 or 3, wherein the Boolean $A\overline{B}$ is combined to the second input signal pattern by the second optical coupler, so that Boolean $A\overline{B}+B$ is obtained, thereby implementing all-optical OR logic operation.

* * * * *